United States Patent
Vulkan et al.

(10) Patent No.: US 10,717,353 B2
(45) Date of Patent: Jul. 21, 2020

(54) PRESSURE RELIEF VALVE

(71) Applicant: RAVAL A.C.S. LTD., Beer-Sheva (IL)

(72) Inventors: Omer Vulkan, D.N. Hanegev (IL); Vladimir Olshanetsky, Beer Sheva (IL); Paul Handy, D.N. Halutza (IL); Denis Kleyman, Mabu'im (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 415 days.

(21) Appl. No.: 15/112,333

(22) PCT Filed: Jan. 8, 2015

(86) PCT No.: PCT/IL2015/050032
§ 371 (c)(1),
(2) Date: Jul. 18, 2016

(87) PCT Pub. No.: WO2015/114618
PCT Pub. Date: Aug. 6, 2015

(65) Prior Publication Data
US 2016/0375759 A1    Dec. 29, 2016

Related U.S. Application Data

(60) Provisional application No. 61/933,371, filed on Jan. 30, 2014, provisional application No. 62/075,289, filed on Nov. 5, 2014.

(51) Int. Cl.
*F16K 31/02* (2006.01)
*B60K 15/035* (2006.01)
(Continued)

(52) U.S. Cl.
CPC ...... *B60K 15/035* (2013.01); *B60K 15/03519* (2013.01); *F16K 17/04* (2013.01);
(Continued)

(58) Field of Classification Search
CPC .......... B60K 15/035; B60K 15/03519; B60K 2015/03296; B60K 2015/03302; F02M 25/0836; F02M 2025/0845
See application file for complete search history.

(56) References Cited

U.S. PATENT DOCUMENTS 3,344,050 A    9/1967    Mayland et al.
3,441,050 A    4/1969    Sanchez
(Continued)

FOREIGN PATENT DOCUMENTS

CN    101076461 A    11/2007
CN    102486145       6/2012
(Continued)

OTHER PUBLICATIONS

International Search Report for International Application No. PCT/IL2015/050032 dated Jun. 5, 2015.
(Continued)

*Primary Examiner* — Reinaldo Sanchez-Medina
(74) *Attorney, Agent, or Firm* — Dorsey & Whitney LLP

(57) ABSTRACT

A pressure relief valve (10, 70) is provided having a first tubing (14a) connectable to a fuel tank (62) and a second tubing (14b) connectable to a fuel vapor treating device (64), the pressure relief valve comprising: an externally actuated (hereinafter EA) valve (20) disposed between the first tubing (14a) and the second tubing (14b) and being configured for pulsed actuation by a controller (28) thereby allowing pulsed fluid flow through a primary port (18a) disposed between the first tubing (14a) and the second tubing (14b).

22 Claims, 8 Drawing Sheets

(51) Int. Cl.
*F16K 17/04* (2006.01)
*F16K 31/06* (2006.01)
*B60K 15/03* (2006.01)

(52) U.S. Cl.
CPC .. *F16K 31/0675* (2013.01); *B60K 2015/0358* (2013.01); *B60K 2015/0359* (2013.01); *B60K 2015/03296* (2013.01); *B60K 2015/03302* (2013.01); *B60K 2015/03585* (2013.01)

(56) References Cited

U.S. PATENT DOCUMENTS

| | | | |
|---|---|---|---|
| 3,971,406 A | 7/1976 | Inada et al. | |
| 4,317,467 A | 3/1982 | Heyland | |
| 4,679,580 A | 7/1987 | Devall et al. | |
| 5,069,188 A * | 12/1991 | Cook | F02M 25/0836 |
| | | | 123/516 |
| 5,211,151 A | 5/1993 | Nakajima et al. | |
| 5,509,395 A * | 4/1996 | Cook | F02M 25/0836 |
| | | | 123/518 |
| 5,605,177 A * | 2/1997 | Ohashi | B60K 15/03519 |
| | | | 123/516 |
| 6,006,781 A | 12/1999 | Brandt et al. | |
| 6,196,258 B1 | 3/2001 | Araki et al. | |
| 9,346,351 B2 * | 5/2016 | Onodera | B60K 15/03519 |
| 2002/0153375 A1 | 10/2002 | Harris | |
| 2006/0185652 A1 * | 8/2006 | Tsuge | F02M 25/0836 |
| | | | 123/519 |
| 2006/0207663 A1 * | 9/2006 | Tsuge | F16K 31/0655 |
| | | | 137/495 |
| 2010/0269921 A1 | 10/2010 | Pifer et al. | |
| 2011/0162728 A1 | 7/2011 | Pifer et al. | |
| 2011/0284781 A1 | 11/2011 | Keller et al. | |
| 2012/0055943 A1 | 3/2012 | Muller-Riederer et al. | |
| 2012/0138610 A1 | 6/2012 | Lee | |
| 2013/0008537 A1 * | 1/2013 | Onodera | F16K 17/18 |
| | | | 137/614.2 |
| 2013/0048890 A1 * | 2/2013 | Miura | F16K 17/196 |
| | | | 251/129.01 |
| 2013/0327424 A1 * | 12/2013 | Kishi | B60K 15/03519 |
| | | | 137/511 |
| 2015/0003418 A1 | 1/2015 | Rosa et al. | |
| 2015/0316007 A1 * | 11/2015 | Williams | F02M 25/0872 |
| | | | 137/583 |

FOREIGN PATENT DOCUMENTS

| | | |
|---|---|---|
| CN | 102529696 | 7/2012 |
| DE | 102010054960 | 6/2012 |
| DE | 102011015999 | 10/2012 |
| GB | 2269375 A | 2/1994 |
| JP | 49021232 U1 | 2/1974 |
| JP | S512742 A | 1/1976 |
| JP | H04105959 A | 4/1992 |
| JP | 2001150980 A | 6/2001 |
| JP | 2006503224 A | 1/2006 |
| JP | 2011220471 A | 11/2011 |
| JP | 2012524878 A | 10/2012 |
| JP | 2013204510 A | 10/2013 |
| RU | 2215222 C2 | 10/2003 |
| RU | 2394696 C2 | 7/2010 |
| WO | 2010064475 A1 | 6/2010 |
| WO | 2010122414 A1 | 10/2010 |

OTHER PUBLICATIONS

International Search Report for International Application No. PCT/IL2015/051066 dated Feb. 15, 2016.

* cited by examiner

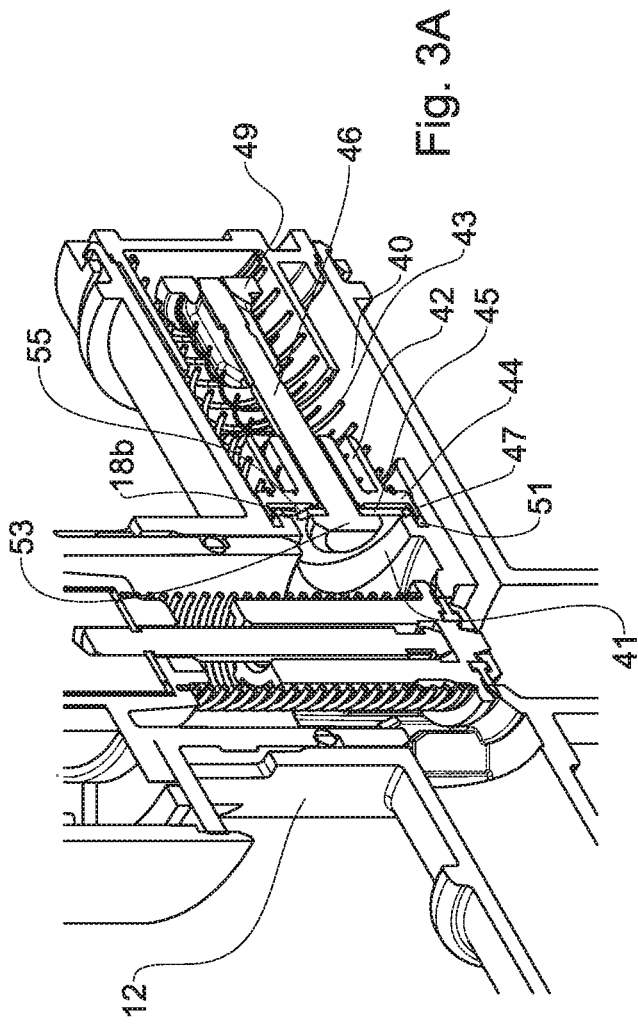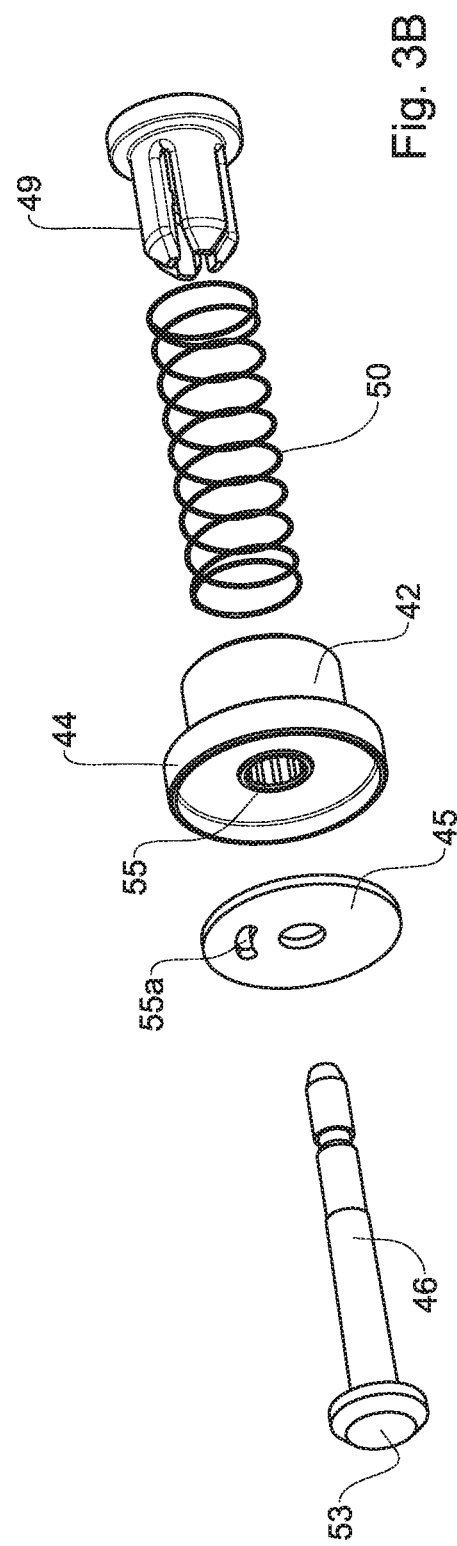

PRESSURE RELIEF VALVE

TECHNOLOGICAL FIELD

The presently disclosed subject matter relates to a relief valve in general, and in particular to a relief valve for fuel vapor systems.

BACKGROUND

There are known pressure relief valves for numerous application and systems. One of the commonly used applications for pressure relief valves is a fuel tank in which typically high pressure is accumulated. The recently developed hybrid vehicles in which fuel tank cooperates together with an electric motor, the fuel vapor system is selectively shut down, thus requiring a pressure relief valve which can independently operate.

GENERAL DESCRIPTION

According to an aspect of the presently disclosed subject matter there is provided a pressure relief valve having a first tubing connectable to a fuel tank and a second tubing connectable to a fuel vapor treating device, the pressure relief valve comprising: an externally actuated (hereinafter EA) valve disposed between the first tubing and the second tubing and being configured for pulsed actuation by a controller thereby allowing pulsed fluid flow through a primary port disposed between the first tubing and the second tubing.

The EA valve can include a housing defining a first tubing and a second tubing and wherein the EA valve is configured to selectively open and close a primary port extending between the first tubing and second tubing. The pulsed actuation can be carried out by a controller.

The EA valve can be configured to be actuated by an external energy source. The EA valve can be an electromechanical valve. The EA valve can be a solenoid having an armature selectively extending in and out of a solenoid body and a plunger mounted on the armature and being configured to sealingly engage the primary port.

The EA valve can be perpendicularly disposed with respect to said first tubing such that pressure from the tank urges said plunger towards said primary port. The controller can be configured to receive electrical power from an energy-storage device. The controller is configured to form a pulsed signal such which allows pulsed actuation of the EA valve.

The EA valve can be configured to be normally close, and to open only in response to an actuation by the controller.

The pulsed fluid flow can be configured to prevent a lift force of a sudden high velocity vapor flow thereby precluding corcking of fuel vapor valves coupled to then tank.

The pulsed actuation can include a signal configured with pulses having a wave length and amplitude which allows measured release of pressure from the tank. The pulses can be configured to open the primary port for a short period of time such that only a predetermined amount of pressure can be released therefrom during each pulse. The pulses can be configured to open said primary port for 200 milliseconds at most. The pulses can configured to repeatedly open said primary port at least two times with a gap of at least 200 milliseconds between the each opening.

The controller can be configured to actuate the EA valve on occasions when the fuel tank can be about to be opened.

The controller can be configured to actuate the EA valve in response to opening of a fuel door.

The pressure relief valve can further include an overpressure valve (hereinafter OP valve).

The OP valve can be configured to selectively open and close an overpressure port disposed between the first tubing and second tubing. The OP valve can be configured to allow fluid flow through the overpressure port in response to a pressure level in the tank rising above a predetermined pressure level. The valve can include a biased shaft being having a shaft head configured to sealingly engage a periphery of the overpressure port. The OP valve can further include a bleeding valve configured for allowing fluid flow between the first tubing and the second tubing when pressure at the tank drops below a predetermined level.

The bleeding valve can include a bleeding aperture formed in the shaft head and having a biased piston slidably mounted therein and being configured to sealingly engage the bleeding aperture. The piston can be provided with a seal configured to sealingly engage the overpressure port and having a corresponding bleeding aperture.

The shaft can be being biased by a shaft spring and the piston can be being biased by a piston spring so disposed with respect to one another such that the bleeding valve can operate independently of the OP valve.

The the OP valve can be configured such that pressure in the first tubing exceeding a predetermined threshold can overcome the biasing force of the shaft spring, allowing thereby fluid flow through the overpressure port and when pressure in the second tubing exceeds a predetermined threshold the biasing force of the piston spring can be overcome, allowing thereby fluid flow through the bleeding valve.

The OP valve can be coaxially disposed with respect to the first tubing such that pressure from the first tubing exceeding a predetermined level facilitating the opening the OP valve. The OP valve can include housing defining a first fluid path being in fluid communication with the first tubing and a second fluid path being in fluid communication with the second tubing and a fluid port extending therebetween and a piston configured to biased towards a wall portion defined inside the housing thereby sealing the fluid port.

The OP valve further comprising a cap member configured to biased towards the piston thereby sealing the fluid port and to retract away from the piston when pressure at the tank drops below a predetermined level. The cap member can include a stop member configured to engage a second wall portion inside the housing thereby limiting the movement of the cap member towards the piston.

The piston can be configured to retract in response to a pressure level in the tank rising above a predetermined pressure level. The piston can be biased by a major spring and the cap member can be biased by a minor spring wherein the major spring exerts forces greater than the forces exerted by the minor spring, such that the pressure level required for opening the port by retracting the piston can be higher than that which can be required for opening the port by retracting the cap member.

According to another aspect of the presently disclosed subject matter there is provided a fuel vapor system comprising a pressure relief valve having a first tubing connectable to a fuel tank and a second tubing connectable to a fuel vapor treating device and an externally actuated valve disposed between the first tubing and the second tubing and being configured for pulsed actuation by a controller thereby allowing pulsed fluid flow between the fuel tank and the fuel vapor treating device.

According to yet another aspect of the presently disclosed subject matter there is provided a pressure relief valve comprising a housing having a first tubing connectable to a first reservoir and a second tubing connectable to a second reservoir being open to the atmosphere and an externally actuated valve disposed in the housing and being configured for pulsed actuation by a controller thereby allowing pulsed fluid flow between the first reservoir and the second reservoir.

According to a further aspect of the presently disclosed subject matter there is provided a method for evacuating fuel vapor from a fuel tank to a fuel vapor treating device. The method comprises providing an externally actuated valve having an inlet port and an outlet port. Coupling a first tubing between the inlet port of the externally actuated valve and the fuel tank and coupling a second tubing between the outlet port of the externally actuated valve and the fuel vapor treating device. Generating a pulsed signal configured for pulsed actuation of the externally actuated valve thereby allowing pulsed fluid flow between the fuel tank and the fuel vapor treating device.

According to yet another aspect of the presently disclosed subject matter there is provided a pressure relief valve for controlling fluid flow between a first fluid path and a second fluid path. The pressure relief valve comprising a piston defining a fluid port therein extending between the first fluid path and the second fluid path and having a first biasing member configured to urge said piston towards a wall portion. The pressure relief valve further can include a cap member having a sealing surface configured to seal said fluid port, said sealing member having a second biasing member configured to urge said sealing surface towards said port, and further having a stop member configured to limit the movement of said sealing member towards said piston.

According to yet another aspect of the presently disclosed subject matter there is provided an over pressure valve for controlling fluid flow between a first fluid path and a second fluid path. The pressure relief valve includes a piston defining a fluid port therein extending between the first fluid path and the second fluid path and having a first biasing member configured to urge the piston towards a wall portion; and a cap member having a sealing surface configured to seal the fluid port, the sealing member having a second biasing member configured to urge the sealing surface towards the port, and further having a stop member configured to limit the movement of the sealing member towards the piston. When pressure at the second fluid path exceeds a predetermined threshold the piston is pushed against the forces of the first biasing member, and the sealing member is urged towards the port of the piston until the stop member limits the movement thereof whereby the sealing surface disengages the port allowing fluid flow between the second fluid path and the first fluid path; and wherein when pressure at the second fluid path drops below a predetermined threshold the sealing member is urged against the forces of the second biasing member while the port is urged towards the wall portion whereby the sealing surface disengages the port allowing fluid flow between the first fluid path and the second fluid path.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 3A is an enlarged side sectional view of a portion of the pressure relief valve of FIG. 1;

FIG. 3B is an exploded view of a bleeding valve in accordance with an example of the presently disclosed subject matter integrated in the pressure relief valve of FIG. 1;

DETAILED DESCRIPTION

Figure 1:
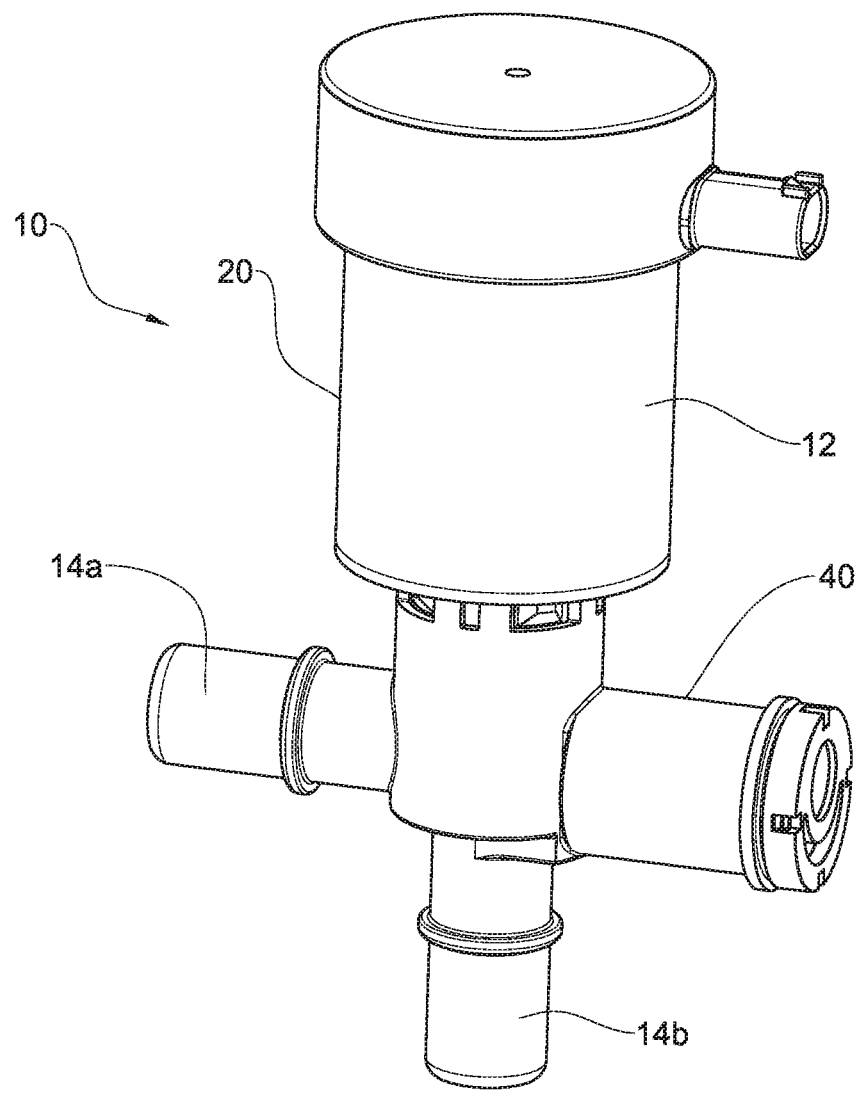
FIG. 1 is a perspective side view of a pressure relief valve in accordance with an example of the presently disclosed subject matter.
Figure 2:
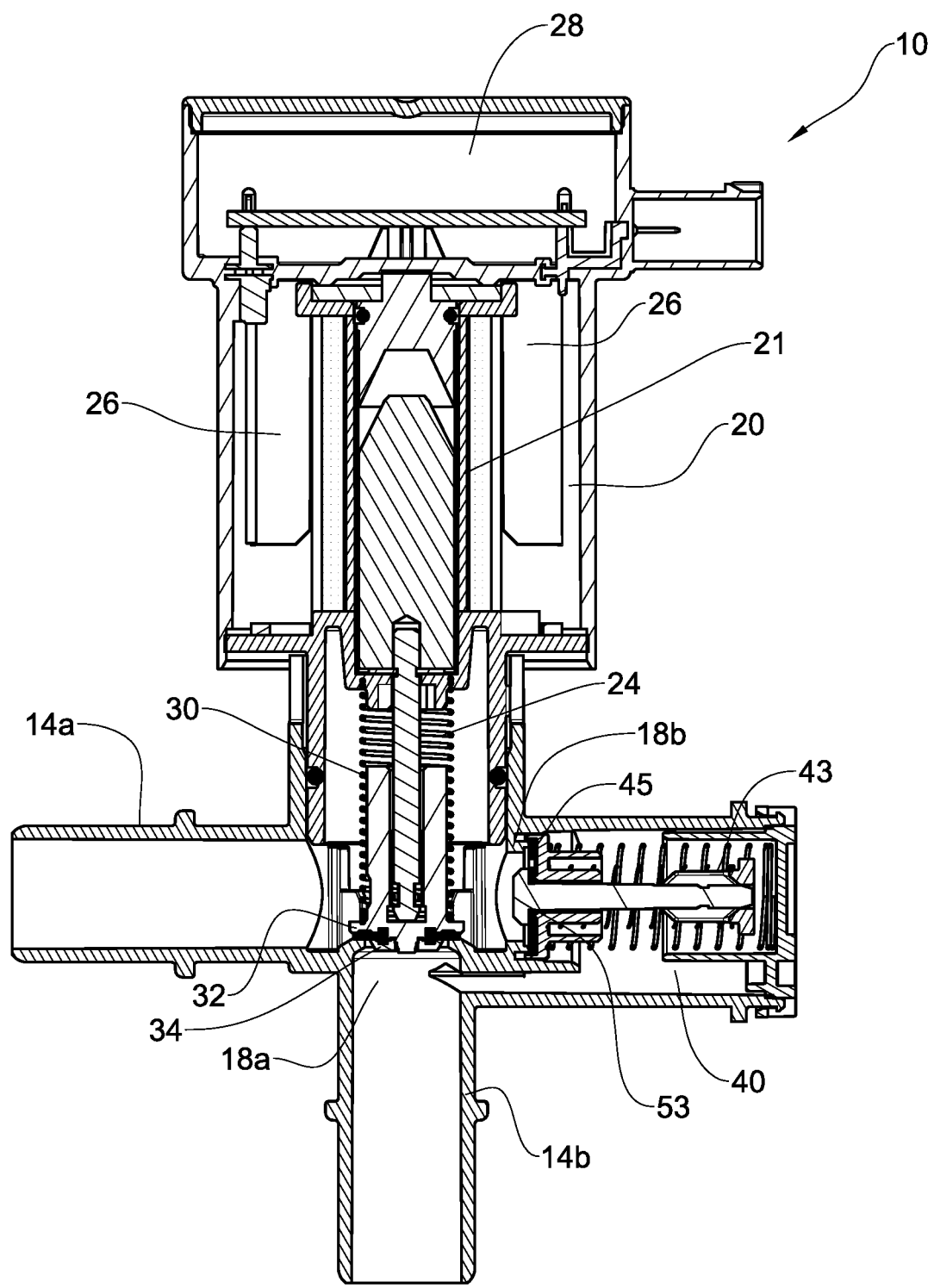
FIG. 2 is a longitudinal sectional view of the pressure relief valve of FIG. 1.
Figure 4:
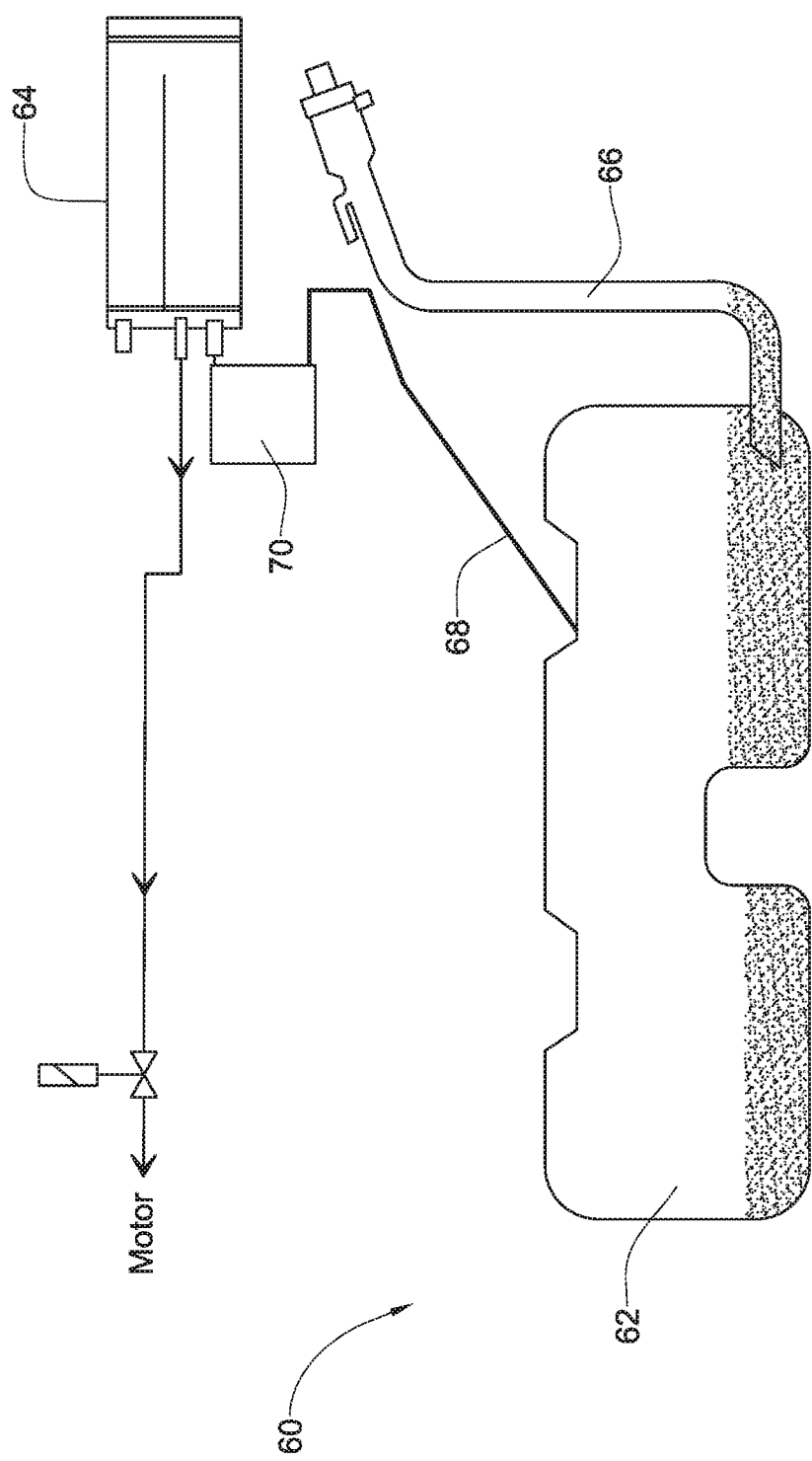
FIG. 4 is a block diagram illustration of a vehicle fuel vapor system having a pressure relief valve in accordance with an example of the presently disclosed subject matter.

FIGS. 1 and 2 show a pressure relief valve 10 comprising a housing 12 having a first tubing 14a connectable to a first reservoir (not shown), for example a fuel tank (as shown in FIG. 4), and a second tubing 14b connectable to a second reservoir, for example a fuel vapor treating device (as shown in FIG. 4). The housing 12 further includes an externally actuated valve (herein after EA valve) 20 disposed therein and being configured to selectively open and close a primary port 18a extending between the first and second tubing 14a and 14b. The EA valve 20 is configured for pulsed actuation by a controller 28 and it thus allows pulsed fluid flow through primary port 18a. The housing 12 further includes an over pressure valve (herein after OP valve) 40 being configured to selectively open and close an overpressure port 18b extending between the first and second tubing 14a and 14b. The OP valve 40 can be configured to allow fluid flow through the overpressure port 18b in response to a predetermined pressure gradient between the first tubing 14a and the second tubing 14b.

The EA valve 20 can be any valve which is actuated by an external energy source, as opposed to being actuated by the pressure gradient across the housing 12, e.g. pressure difference between the first tubing 14a and the second tubing 14b. According to an example of the presently disclosed subject matter the EA valve is an electromechanical valve, here illustrated as solenoid, otherwise the EA valve can be pneumatically actuated, or actuated by any other external source of energy.

In the present example, the EA valve 20 includes solenoid body 21 having an armature 22 selectively extending in or out of the solenoid body. The armature 22 can be biased by a solenoid spring 24 which is disposed such that the armature normally extends out of the solenoid body 21. The EA valve 20 further includes a plunger 30 having a plunger head 32 and a seal 34 configured to sealingly engage the primary port 18a. The plunger 30 is mounted on the armature 22 such that when the latter extends out of the solenoid body 21 the plunger head 32 engages the primary port 18a preventing fluid flow therethrough.

According to an example, the solenoid spring 24 bears on one side thereof against a shoulder portion defined on the plunger 30, and on the other side thereof bears against the solenoid body 21.

The solenoid body 21 further includes a coil 26 wrapped thereabout and configured to energize the armature 22 causing it to withdraw into the solenoid body 21 by overcoming the biasing force of spring 24.

According to an example, the EA valve 20 is activated by a controller 28 which is adapted to receive electrical power from a vehicle alternator or from any other energy-storage device (not shown). The controller 28 is configured to form a pulsed signal such which allows pulsed actuation of the solenoid as explained in detail hereinafter. The controller 28 can be configured to receive an actuation signal from the vehicle computer and can include a circuit board which forms a pulsed signal as required. The EA valve 20 can be configured to be normally close, and can be opened only in response to an actuation by the controller 28, for example, an electrical signal.

The EA valve 20 can be perpendicularly disposed with respect to the first tubing 14a. This way, in case the first tubing 14a is coupled to a fuel vapor outlet of a fuel tank, fluid flow from the tank urges the plunger head 32 towards the primary port 18a, and the pressure inside the tank facilitate maintaining the EA valve 20 in the closed position.

The over pressure valve (herein after OP valve) 40, as best seen in FIGS. 3A and 3B, includes a shaft 42 being biased by a shaft spring 43 and configured with a shaft head 44 and a sealing protrusion 47 defined about the periphery thereof. The sealing protrusion 47 is configured to sealingly engage a corresponding groove 51 defined about the periphery of the overpressure port 18b. The shaft spring 43 is mounted over the shaft 42 and bears against the housing 12 on one end thereof and against the shaft head 44 on the other end thereof thereby urging the latter to sealingly engage the overpressure port 18b.

The OP valve 40 further includes a bleeding valve 41 comprising piston 46 slidabley mounted inside the shaft 42 and through a bleeding aperture 55 formed in the shaft head 44. The piston 46 can include a piston head 53 defined at one end thereof configured to selainglay engage the bleeding aperture 55. The other end thereof is coupled to bearing member 49 having a diameter smaller than that of the shaft spring 43. A seal 45 having a corresponding bleeding aperture 55a is mounted between the shaft head 44 and the piston head 53 and being configured to sealingly engage the overpressure port 18b. The periphery of the seal 45 is disposed between the shaft head 44 and the wall of the overpressure port 18b.

The piston 46 is biased by a piston spring 50 bearing against the bearing member 49 on one side thereof and against the shaft head 44 on the other end thereof. The piston spring 50 is configured with a diameter smaller than that of the shaft spring 43. Accordingly, the piston 46, the piston spring 50 and the bearing member 49 are disposed inside the periphery of the shaft spring such that the bleeding valve 41 can operate independently of the shaft 42.

The OP valve 40 is configured such that pressure in the first tubing 14a exceeding a predetermined threshold can overcome the biasing force of the shaft spring 43, whereby the sealing protrusion 47 of the shaft head 44 slides away from the corresponding groove 51 allowing fluid flow through the overpressure port 18b. When pressure in the second tubing 14b exceeds a predetermined threshold the biasing force of the piston spring 50 is overcome, whereby the piston 46 is moved towards the port 18b.

According to an example the OP valve is coaxially disposed with respect to the first tubing 14a, hence, pressure or fluid flow from the first tubing is applied directly on the shaft head 44 facilitating the opening thereof in case the pressure at the first tubing 14a exceeds a certain threshold.

Thus, in case the first tubing 14a is coupled to a fuel vapor outlet of a fuel tank, when pressure in the tank exceed a predetermined level, the shaft head 44 of the OP valve 40 is opened allowing thereby fluid flow from the first tubing towards the second tubing 14b, even in case the EA valve 20 is closed.

Reference is now made to FIG. 4, the pressure relief valve can be integrated in a vehicle fuel vapor system generally designated 60 and having a fuel tank 62 and a vapor treating device 64, such as a canister. The fuel tank 62 is coupled to a filler neck 66 and includes a fuel vapor outlet tube 68, which is coupled to a first tubing of the pressure relief valve 70. A second tubing extending from the pressure relief valve 70 is coupled to the vapor treating device 64, which can be open to the atmosphere.

The following is a detailed explanation of the operation of the pressure relief valve as described in FIGS. 1 to 3B, however in the case where the valve is integrated in a fuel vapor system and mounted in a fuel vapor path between a fuel tank and a vapor treating device, hereinafter referred to as a canister.

The pressure relief valve 10 allows opening the EA valve 20 in response to a signal for example, an electric signal form the vehicle computer, and the OP valve 40 can be open in response to a pressure gradient across the valve larger than a predetermined gradient. That is to say, in the case where the first tubing 14a is coupled to a fuel tank (as shown in FIG. 4) and the second tubing 14b is coupled to a canister, when the pressure at the tank exceed a predetermined level the OP valve 40 can be opened so as to bring the pressure level in the tank to the desired pressure range. Similarly, when the pressure at the tank drops below a predetermined level the bleeding valve 41 can be opened so as to bring the pressure level in the tank to the desired pressure range.

Figure 5A:
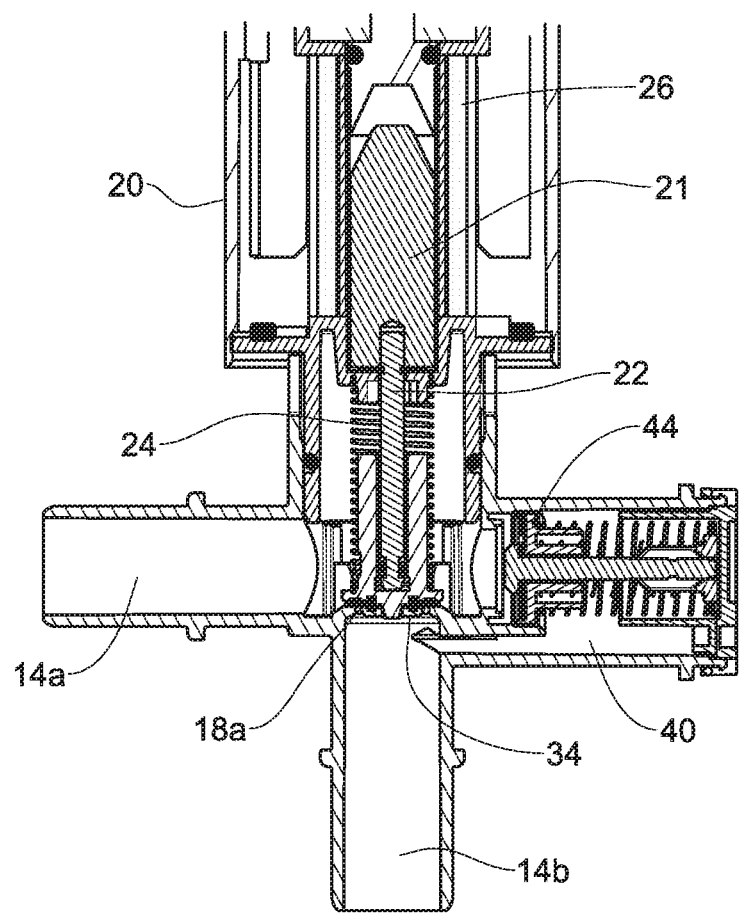
FIG. 5A is a longitudinal sectional view of the pressure relief valve of FIG. 1 in the fully closed position.

FIG. 5A shows the pressure relief valve 10 in a fully closed position in which both the EA valve 20 and the OP valve 40 are closed. In this position, the plunger head 32 of the EA valve 20 sealingly engages the primary port 18a and the shaft head 44 of the OP valve sealingly engage the overpressure port 18b. Thus, in this position, fuel vapor flow from the first tubing 14a to the second tubing 14b, and hence form the tank to the canister is precluded. It is appreciated that is this position the plunger 30 operates under the force of the spring 24 urging the seal 34 on the primary port 18a. Thus, in this position there is no need for energy from an external source to energize the EA valve 20.

Figure 5B:
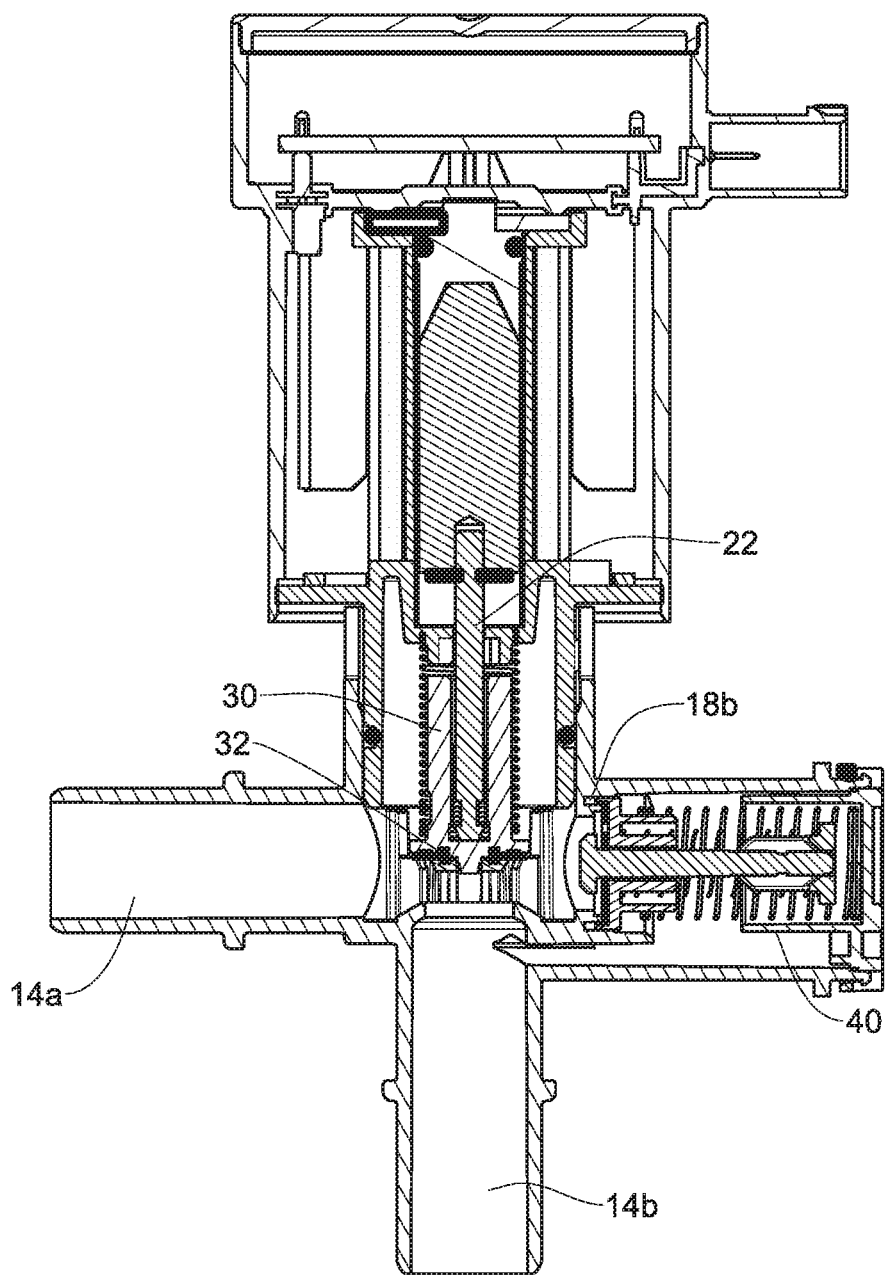
FIG. 5B is a longitudinal sectional view of the pressure relief valve of FIG. 1 in the open position.

FIG. 5B shows the pressure relief valve 10 in the open position thereof, in which the EA valve 20 is opened while the OP valve 40 remains closed. In this position, the plunger head 32 of the EA valve 20 disengages the primary port 18a thereby allowing vapor flow from the tank towards the canister. Opening the EA valve 20 is carried out in response to a pulsed signal from the controller 27 which in the case of a solenoid energizes the coil 26 wrapped about the solenoid body 21 thereby causing a pulsed displacement of the armature 22 away from the primary port 18a. At the end of each pulse the spring 24 forces the armature 22 and the plunger 30 to engage back the primary port 18a. Thus, as a result of the pulsed signal from the controller 28 a pulsed fluid flow is formed between the first tubing 14a and the second tubing 14b. Hence, vapor flow from the tank to the canister is allowed in a pulsed fashion, such that does not cause corking of other fuel vapor valves coupled to the tank such which can be clogged by the lift force of the sudden high velocity vapor flow.

Accordingly, the pulsed signal can be configured with pulses having a wave length and amplitude which allows measured release of pressure, such which will not result in malfunction of other fuel vapor accessory. According to an example, each pulse can be at most 200 milliseconds long and can be repeated for 3 or 4 times or more with a gap of at least 200 milliseconds between the pulses.

It is appreciated that the signal can be actuated on occasions when the fuel tank is about to be opened, for instance before refueling thereof, where it is desired to release pressure from the fuel tank, and to bring it to substantially equilibrium with the atmosphere. Accordingly, the pulses can be configured in accordance with the expected time since it is acknowledged that the vehicle's tank is about be refueled until the opening of fuel tank actual occurs. That is to say, if for example opening the fuel door is utilized as a trigger following which it is expected that the fuel tank is to be opened, the time interval during which the pressure in the tank is to be releases is the expected time between the opening of the fuel door and the actual opening of the fuel tank. According to some examples the expected time interval is 2 seconds, thus the pulsed signal is configured to allow substantially releasing the pressure from the tank within 2 seconds.

According to the latter example, opening the fuel door can automatically actuate a signal to actuate the controller 28 which in return forms a pulsed signal to dictate the operation of the solenoid valve 20. It is appreciated that other triggers can be utilized, such which the actuation of the pulsed signal is carried out within a predetermined time interval prior to opening of the fuel tank.

It is further appreciated that once the pressure in the fuel tank is released following the pulsed opening of the EA valve 20, the valve can be continuously opened without pulses, for example to allow refueling of the tank. It is thus appreciated that the amount of electric power required when forming the pulses can be higher than the amount of energy required to maintain the EA valve 20 in the continuous open position thereof. This is due to the fact that opening the EA valve 20 when the fuel tank is under high pressure requires more energy than when maintaining the EA valve open once the pressure is released from the tank. Accordingly, the pulsed signal actuated by the controller 27 can include pulses having high voltage amplitude, while the last pulse following which the EA valve 20 remains opened the voltage amplitude can be lower. This way, overheating of the EA valve 20 is precluded.

Figure 6A:
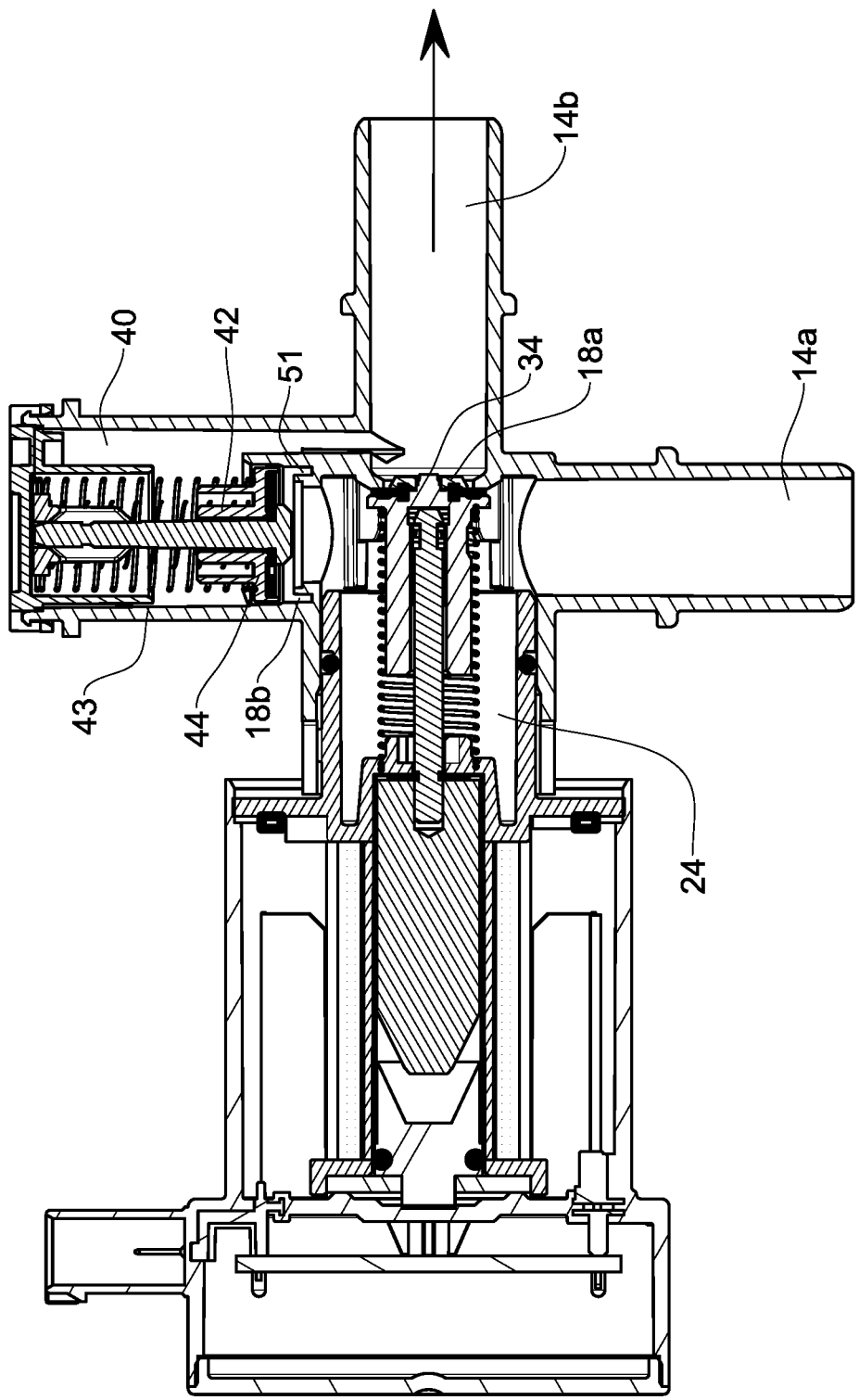
FIG. 6A is a longitudinal sectional view of the pressure relief valve of FIG. 1 in a position under overpressure conditions.

Referring now to FIG. 6A the pressure relief valve 10 can be opened in response to a high pressure in the first tubing side 14a, such as when pressure in the fuel tank exceeds a predetermined level. At this position, the forces applied by the pressure within the tank overcome the forces of the shaft spring 43 biasing the shaft 42 of the OP valve 40, this results in the disengagement of the sealing protrusion 47 of the shaft head 44 from the groove 51 defined about the periphery of the overpressure port 18b thus the pressure from within the tank can be released by allowing vapor flow therefrom to pass through the overpressure port towards the canister.

It is appreciated that the operation of the OP valve 40 can be configured as an emergency valve preventing overpressure in the tank such which can cause damage to the tank. Thus under normal condition the OP valve 40 remains closed.

As for the EA valve 20, in this position the latter remains closed under the forces of the spring 24 urging the seal 34 on the primary port 18a. Thus, as in the fully closed position there is no need for energy from an external source to energize the EA valve 20, and the OP valve 40 can operate independently solely in response to the pressure in the tank.

Figure 6B:
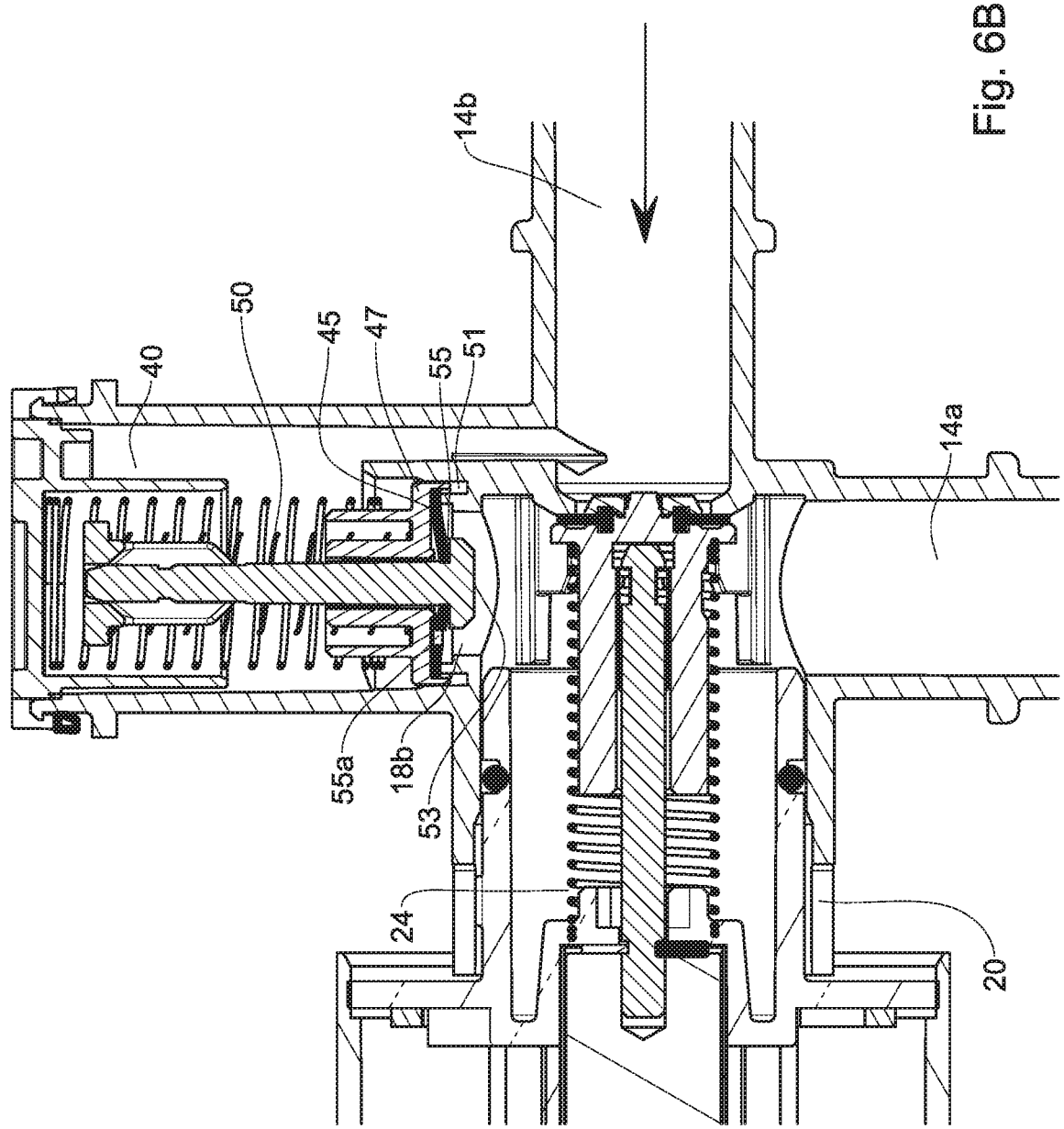
FIG. 6B is a longitudinal sectional view of the pressure relief valve of FIG. 1 in a position under vacuum conditions.

Referring now to FIG. 6B the pressure relief valve 10 can be opened in response to a low pressure in the first tubing side 14a, such as when pressure in the fuel tank drops below a predetermined level, for example when vacuum is formed in the tank. At this position the forces applied by the pressure within the tank overcome the forces of the piston spring 50 biasing the piston 46 of the bleeding valve 41 away from the overpressure port 18b. As a result, the piston head 53 is inwardly urged disengaging the shaft head 44, allowing thereby fluid flow through the bleeding aperture 55 formed therein. Since the periphery of the seal 45 is disposed between the shaft head 44 and the wall of the overpressure port 18b, when the piston head 53 is moved away from the shaft head 44, the periphery of the seal remains in place while the center thereof is inwardly deformed. In this position fluid flow through the bleeding apertures 55 an the corresponding bleeding valve 55a is facilitated, thus allowing vacuum from within the tank to be released.

Those skilled in the art to which the presently disclosed subject matter pertains will readily appreciate that numerous changes, variations, and modifications can be made without departing from the scope of the invention, mutatis mutandis.

The invention claimed is:

1. A pressure relief valve, comprising:
   a first tubing connectable to a fuel tank of a vehicle, the vehicle including a vehicle computer;
   a second tubing connectable to a fuel vapor treating device,
   a controller, configured for receiving an actuation signal from the vehicle computer, wherein said controller is different from the vehicle computer, wherein said controller includes at least one circuit configured to generate a pulsed signal;
   an externally actuated (EA) valve disposed between the first tubing and the second tubing and being configured for pulsed actuation by said pulsed signal generated by said controller, thereby allowing pulsed fluid flow through a primary port disposed between said first tubing and said second tubing.

2. The pressure relief valve according to claim 1, wherein said EA valve is configured to be actuated by an external energy source.

3. The pressure relief valve according to claim 2 wherein said EA valve includes an electromechanical valve.

4. The pressure relief valve according to claim 3 wherein said EA valve includes a solenoid having an armature selectively extending in and out of a solenoid body and a plunger mounted on said armature and being configured to sealingly engage said primary port.

5. The pressure relief valve according to claim 4 wherein said EA valve is perpendicularly disposed with respect to said first tubing such that pressure from the tank urges said plunger towards said primary port.

6. The pressure relief valve according to claim 1, further comprising an overpressure valve (OP valve).

7. The pressure relief valve according to claim 6 wherein said OP valve is configured to selectively open and close an overpressure port disposed between said first tubing and said second tubing.

8. The pressure relief valve according to claim 7 wherein said OP valve is configured to allow fluid flow through said overpressure port in response to a pressure level in the tank rising above a predetermined pressure level.

9. The pressure relief valve according to claim 7 wherein said OP valve includes a biased shaft having a shaft head configured to sealingly engage a periphery of said overpressure port.

10. The pressure relief valve according to claim 9 wherein said OP valve includes a bleeding valve configured for allowing fluid flow between said first tubing and said second tubing when pressure at the tank drops below a predetermined level.

11. The pressure relief valve according to claim 10, wherein at least one of the following:
   said bleeding valve includes a bleeding aperture formed in said shaft head and having a biased piston slidably mounted therein and being configured to sealingly engage said bleeding aperture;
   said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture;
   said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture, and, wherein said shaft is being biased by a shaft spring and said piston is being biased by a piston spring so disposed with respect to one another such that said bleeding valve can operate independently of said OP valve; or
   said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture, and, wherein said shaft is being biased by a shaft spring and said piston is being biased by a piston spring so disposed with respect to one another such that said bleeding valve can operate independently of said OP valve, and, wherein said OP valve is configured such that pressure in said first tubing exceeding a predetermined threshold can overcome the biasing force of said shaft spring, allowing thereby fluid flow through said overpressure port and when pressure in said second tubing exceeds a predetermined threshold the biasing force of said piston spring is overcome, allowing thereby fluid flow through said bleeding valve.

12. The pressure relief valve according to claim 10, wherein at least one of:
   said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture, and, wherein said shaft is being biased by a shaft spring and said piston is being biased by a piston spring so disposed with respect to one another such that said bleeding valve can operate independently of said OP valve; and wherein said OP valve includes housing defining a first fluid path being in fluid communication with said first tubing and a second fluid path being in fluid communication with said second tubing and a fluid port extending therebetween and a piston configured to be biased towards a wall portion defined inside said housing thereby sealing said fluid port;
   said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture, and, wherein said shaft is being biased by a shaft spring and said piston is being biased by a piston spring so disposed with respect to one another such that said bleeding valve can operate independently of said OP valve; and wherein said OP valve includes housing defining a first fluid path being in fluid communication with said first tubing and a second fluid path being in fluid communication with said second tubing and a fluid port extending therebetween and a piston configured to be biased towards a wall portion defined inside said housing thereby sealing said fluid port, and, wherein said OP valve further comprising a cap member configured to be biased towards said piston thereby sealing said fluid port and to retract away from said piston when pressure at the tank drops below a predetermined level; or
   said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture, and, wherein said shaft is being biased by a shaft spring and said piston is being biased by a piston spring so disposed with respect to one another such that said bleeding valve can operate independently of said OP valve; and wherein said OP valve includes housing defining a first fluid path being in fluid communication with said first tubing and a second fluid path being in fluid communication with said second tubing and a fluid port extending therebetween and a piston configured to be biased towards a wall portion defined inside said housing thereby sealing said fluid port, and, wherein said OP valve further comprising a cap member configured to be biased towards said piston thereby sealing said fluid port and to retract away from said piston when pressure at the tank drops below a predetermined level, and, wherein said cap member includes a stop member configured to engage a second wall portion inside said housing thereby limiting the movement of said cap member towards said piston.

13. The pressure relief valve according to claim 11, wherein said piston is configured to retract in response to a pressure level in the tank rising above a predetermined pressure level.

14. The pressure relief valve according to claim 7, wherein said OP valve is coaxially disposed with respect to said first tubing such that pressure from said first tubing exceeding a predetermined level facilitating the opening said OP valve.

15. The pressure relief valve according to claim 10, wherein:

said bleeding valve includes a bleeding aperture formed in said shaft head and having a biased piston slidably mounted therein and being configured to sealingly engage said bleeding aperture, and, wherein said piston is provided with a seal configured to sealingly engage the overpressure port and having a corresponding bleeding aperture, and, wherein said shaft is being biased by a shaft spring and said piston is being biased by a piston spring so disposed with respect to one another such that said bleeding valve can operate independently of said OP valve; and wherein said OP valve includes housing defining a first fluid path being in fluid communication with said first tubing and a second fluid path being in fluid communication with said second tubing and a fluid port extending therebetween and a piston configured to be biased towards a wall portion defined inside said housing thereby sealing said fluid port, and, wherein said OP valve further comprising a cap member configured to be biased towards said piston thereby sealing said fluid port and to retract away from said piston when pressure at the tank drops below a predetermined level, and, wherein said cap member includes a stop member configured to engage a second wall portion inside said housing thereby limiting the movement of said cap member towards said piston; and said piston is biased by a major spring and said cap member is biased by a minor spring wherein said major spring exerts forces greater than the forces exerted by said minor spring, such that the pressure level required for opening said port by retracting said piston is higher than that which is required for opening the port by retracting said cap member.

16. The pressure relief valve according to claim 1 wherein said EA valve includes a housing defining said first tubing and said second tubing, and wherein said EA valve is configured to selectively open and close said primary port extending between said first tubing and said second tubing.

17. The pressure relief valve according to claim 1, wherein at least one of the following:
said controller is configured to receive electrical power from an energy-storage device;
said EA valve is configured to be normally close, and to open only in response to an actuation by said controller;
said pulsed fluid flow is configured to prevent a lift force of a sudden high velocity vapor flow thereby precluding corking of fuel vapor valves coupled to then tank;
said pulsed actuation includes a signal configured with pulses having a wave length and amplitude which allows measured release of pressure from the tank;
said pulsed actuation includes a signal configured with pulses having a wave length and amplitude which allows measured release of pressure from the tank, and, wherein said pulses are configured to open said primary port for a short period of time such that only a predetermined amount of pressure can be released therefrom during each pulse;
said pulsed actuation includes a signal configured with pulses having a wave length and amplitude which allows measured release of pressure from the tank, and, wherein said pulses are configured to open said primary port for 200 milliseconds at most;
said pulsed actuation includes a signal configured with pulses having a wave length and amplitude which allows measured release of pressure from the tank, and, wherein said pulses are configured to repeatedly open said primary port at least two times with a gap of at least 200 milliseconds between the each opening;
said controller is configured to actuate said EA valve on occasions when the fuel tank is about to be opened; or
said controller is configured to actuate said EA valve in response to opening of a fuel door.

18. The pressure relief valve according to claim 1, wherein said controller is accommodated within a chamber provided in the pressure relief valve.

19. The pressure relief valve according to claim 1, wherein said EA valve is configured for pulsed actuation by said controller, responsive to said controller receiving an actuation signal from the vehicle computer.

20. A fuel vapor system for a vehicle, the vehicle including a vehicle computer, the fuel vapor system comprising:
a pressure relief valve having a first tubing connectable to a fuel tank and a second tubing connectable to a fuel vapor treating device; and
an externally actuated valve having a controller configured for receiving an actuation signal from the vehicle computer, the externally actuated valve being disposed between said first tubing and said second tubing and being configured for pulsed actuation by said pulsed signal generated by the controller, thereby allowing pulsed fluid flow between said fuel tank and said fuel vapor treating device, wherein said controller is different from the vehicle computer, wherein said controller includes at least one circuit configured to generate a pulsed signal.

21. A pressure relief valve, comprising:
a housing having a first tubing connectable to a first reservoir and a second tubing connectable to a second reservoir being open to the atmosphere; and
an externally actuated valve disposed in said housing and comprising a controller configured for receiving an actuation signal from a vehicle computer, the externally actuated valve being configured for pulsed actuation by the controller, thereby allowing pulsed fluid flow between said first reservoir and said second reservoir, wherein said controller is different from the vehicle computer, wherein said controller includes at least one circuit configured to generate a pulsed signal that enables pulsed actuation of said externally actuated valve.

22. A method for evacuating fuel vapor from a fuel tank to a fuel vapor treating device, the method comprising:
providing an externally actuated valve having a controller, an inlet port and an outlet port;
coupling a first tubing between the inlet port of the externally actuated valve and the fuel tank of a vehicle, the vehicle including a vehicle computer, wherein said controller is different from the vehicle computer, wherein said controller includes at least one circuit configured to generate a pulsed signal which allows pulsed actuation of said externally actuated valve;
coupling a second tubing between the outlet port of the externally actuated valve and the fuel vapor treating device; and
the controller generating the pulsed signal configured for pulsed actuation of the externally actuated valve, thereby allowing pulsed fluid flow between the fuel tank and the fuel vapor treating device.

* * * * *